(12) United States Patent
Park et al.

(10) Patent No.: US 7,899,790 B2
(45) Date of Patent: Mar. 1, 2011

(54) BACKING UP OF HETEROGENEOUS TERMINAL USER INFORMATION IN (INTERNET PROTOCOL) IP TERMINAL

(75) Inventors: Young-June Park, Hwaseong-si (KR); Yong-Sung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 427 days.

(21) Appl. No.: 12/071,530

(22) Filed: Feb. 21, 2008

(65) Prior Publication Data
US 2008/0201387 A1 Aug. 21, 2008

(30) Foreign Application Priority Data
Feb. 21, 2007 (KR) .................. 10-2007-0017591

(51) Int. Cl.
*G06F 17/30* (2006.01)
(52) U.S. Cl. ............ 707/640; 707/655; 707/656; 707/610; 707/611
(58) Field of Classification Search .......... 707/610, 707/611, 640, 655, 656
See application file for complete search history.

(56) References Cited

U.S. PATENT DOCUMENTS

| | | | |
|---|---|---|---|
| 6,215,790 B1 * | 4/2001 | Voit et al. | 370/401 |
| 6,449,622 B1 * | 9/2002 | LaRue et al. | 1/1 |
| 6,460,051 B1 * | 10/2002 | LaRue et al. | 1/1 |
| 6,487,560 B1 * | 11/2002 | LaRue et al. | 707/625 |
| 6,535,892 B1 * | 3/2003 | LaRue et al. | 1/1 |
| 7,349,719 B2 * | 3/2008 | Buniatyan | 455/557 |
| 2002/0156798 A1 * | 10/2002 | LaRue et al. | 707/201 |

FOREIGN PATENT DOCUMENTS

| | | |
|---|---|---|
| KR | 10-2004-0041192 | 5/2004 |
| KR | 10-2004-0074490 | 8/2004 |
| KR | 10-2005-0031715 | 4/2005 |

OTHER PUBLICATIONS

*Decision of Grant* from the Korean Patent Office issued in Applicant's corresponding Korean Patent Application No. 2007-0017591 dated Apr. 28, 2008.

* cited by examiner

*Primary Examiner* — Jean M Corrielus
(74) *Attorney, Agent, or Firm* — H.C. Park & Associates, PLC

(57) ABSTRACT

An apparatus to back up heterogeneous terminal user information in an IP terminal includes a terminal connection interface, a temporary synchronization storage unit, a synchronization controller, and a data converter. The terminal connection interface connects to a heterogeneous terminal. In the apparatus and its method, the temporary synchronization storage unit temporarily stores phone number information of the heterogeneous terminal. Upon connecting to the heterogeneous terminal, the synchronization controller sets synchronization with the heterogeneous terminal and stores phone number information of the heterogeneous terminal. The data converter performs data conversion between the stored phone number information of the heterogeneous terminal and stored phone number information of the IP terminal.

14 Claims, 4 Drawing Sheets

BACKING UP OF HETEROGENEOUS TERMINAL USER INFORMATION IN (INTERNET PROTOCOL) IP TERMINAL

CLAIM OF PRIORITY

This application makes reference to, incorporates the same herein, and claims all benefits accruing under 35 U.S.C. §119 from an application for APPARATUS AND METHOD FOR BACKUP OF HETEROGENEOUS TERMINAL USER INFORMATION IN IP TERMINAL earlier filed in the Korean Intellectual Property Office on 21 Feb. 2007 and there duly assigned Serial No. 2007-0017591.

BACKGROUND OF THE INVENTION

1. Field of the Invention

The present invention relates to an apparatus and method of backing up heterogeneous terminal user information in an Internet Protocol (IP) terminal.

2. Description of the Related Art

In general, mobile communication terminals support Personal Computer (PC) links. A PC link is a PC application program configured to store and manage data of the mobile communication terminals.

A PC link synchronizes data while exchanging an eXtensible Markup Language (XML) document using a specific protocol on the basis of the Synchronization Markup Language (SyncML) standard.

Conventionally, if a PC takes a database pointer from a mobile communication terminal, the PC backs up a database of the mobile communication terminal as is.

Also, the PC and the mobile communication terminal have been designed to guarantee information sameness all of the time by, upon a next synchronization, comparing databases of the PC and the mobile communication terminal with each other to identify a data change at both sides and then checking a time.

However, the conventional data backup method using the PC link holds data dependent on the mobile communication terminals.

For example, if a specific mobile communication terminal connects to a PC and attempts to synchronize and back up data using a PC link, a database of the mobile communication terminal is backed up as is. Therefore, mobile communication terminals could not move phone numbers to each other, if they have differently structured databases, even though they may be made by the same manufacturer.

Because of this, the PC link, an application, has a drawback of not only having a functional limitation but also being unavailable without an indispensable medium called a PC.

Wired home phones, such as IP terminals, need to be able to move only respective desired data rather than simply synchronize with a diversity of mobile communication terminals, in consideration of inconvenient carriage and being shared by family members.

For example, phone numbers of children's friends each have to be able to be stored in one IP terminal. However, in the conventional data backup method using the PC link, the work cannot be implemented because the synchronized database and mobile communication terminal is based on a point-to-point synchronization relationship.

SUMMARY OF THE INVENTION

The present invention has been made to solve the foregoing problems of the prior art and therefore the present invention provides an apparatus and method of backing up heterogeneous terminal user information in an IP terminal, for performing a synchronization function and a backup function with at least one mobile communication terminal in the IP terminal.

According to an aspect of the invention for realizing the above objects, an apparatus is provided to back heterogeneous terminal user information in an IP terminal. The apparatus includes a terminal connection interface, a temporary synchronization storage unit, a synchronization controller, and a data converter. The terminal connection interface connects to a heterogeneous terminal. The temporary synchronization storage unit temporarily stores phone number information of the heterogeneous terminal connected and synchronized. Upon connecting to the heterogeneous terminal through the terminal connection interface, the synchronization controller sets synchronization with the heterogeneous terminal and concurrently, stores phone number information of the connected heterogeneous terminal in the temporary synchronization storage unit. The data converter performs data conversion between the phone number information of the heterogeneous terminal stored in the temporary synchronization storage unit and phone number information of the IP terminal stored in the data storage unit.

The apparatus may further include a user interface for displaying phone number information stored in the temporary synchronization storage unit or the data storage unit for a user and allowing the user to select the displayed phone number information of the heterogeneous terminal.

The apparatus may further include a database format storage unit for storing database format information of itself and at least one heterogeneous terminal.

Upon connecting to one or more heterogeneous terminals concurrently or respectively, the synchronization controller may temporarily store each of phone number information of the heterogeneous terminals in the temporary synchronization storage unit.

The data converter may convert only a database format of phone number information selected through the user interface and update the temporary synchronization storage unit by the converted phone number information. The data converter may identify a database format of the heterogeneous terminal stored in the database format storage unit using information of the heterogeneous terminal that is, upon synchronization, detected by the synchronization controller, then compare the identified database format with its own database format, and then perform data conversion.

In the event that there is no phone number information for conversion, the data converter may convert data into a null value and apply the null value to a small size number of phone number information of the heterogeneous terminal for conversion.

The heterogeneous terminal maybe any one of an IP terminal, a mobile communication terminal, a Personal Digital Assistant (PDA) and a Wireless Local Area Network (WLAN) terminal. The terminal connection interface may include any one of an infrared communication protocol, a wired/wireless IP protocol, and a Host Signal Processing (HSP) protocol.

According to another aspect of the invention for realizing the above objects, a method of backing up heterogeneous terminal user information in a selective synchronization method of an IP terminal is provided. The method includes: connecting and synchronizing with a heterogeneous terminal; temporarily storing phone number information of the synchronized heterogeneous terminal; converting a database format of phone number information stored in a data storage unit and updating the temporarily stored phone number information by the converted database format; and synchronizing and transmitting the temporarily stored phone number information to the heterogeneous terminal.

The method may further include converting a database format of the temporarily stored phone number information of the heterogeneous terminal and storing the converted database format in the data storage unit.

The converting of the database format and updating of the temporarily stored phone number information may include displaying phone number information stored in the temporary synchronization storage unit or the data storage unit for a user; and allowing the user to select the displayed phone number information of the heterogeneous terminal.

Connecting and synchronizing with the heterogeneous terminal may include identifying the database format of the heterogeneous terminal stored in a database format storage unit, using information of the heterogeneous terminal that is detected through the database format storage unit storing database format information of itself and at least one heterogeneous terminal.

In the event that there is no phone number information for conversion, the converting of the database format of the phone number information and updating of the temporarily stored phone number information may convert data into a null value and apply the null value to a small size number of phone number information of the heterogeneous terminal for conversion.

The heterogeneous terminal may be any one of an IP terminal, a mobile communication terminal, a PDA terminal, and a WLAN terminal. A method of connection with the heterogeneous terminal may include any one of an infrared communication protocol, a wired/wireless IP protocol, and a Host Signal Processing (HSP) protocol.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

The present invention is described more fully hereinafter with reference to the accompanying drawings, in which exemplary embodiments of an apparatus and method of backing up heterogeneous terminal user information in an IP terminal of the present invention are shown. It will be understood by those having an ordinary knowledge in the art that the system described below is merely an example for describing the present invention with no limit as to the scope of the present invention.

Figure 1:
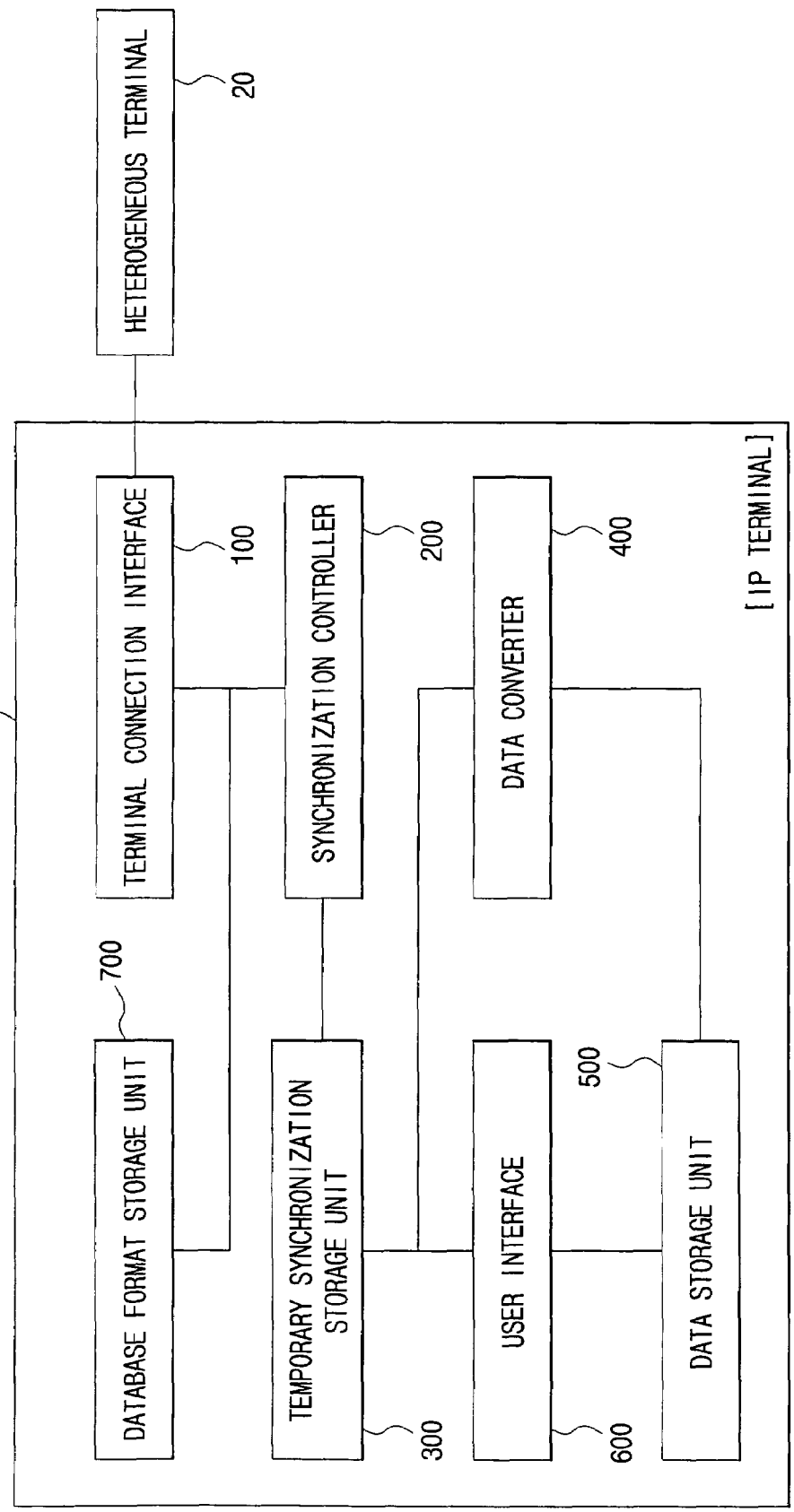
FIG. 1 is a block diagram of an apparatus and method of backing up heterogeneous terminal user information in an IP terminal according to an embodiment of the present invention.

FIG. 1 is a block diagram of an apparatus and method of backing up heterogeneous terminal user information in an IP terminal according to an embodiment of the present invention. The backup apparatus 10 includes a terminal connection interface 100, a synchronization controller 200, a temporary synchronization storage unit 300, a data converter 400, and a data storage unit 500. The backup apparatus further includes a user interface 600 and a database format storage unit 700.

The terminal connection interface 100 connects to a heterogeneous terminal 20. The terminal connection interface 100 can apply the inclusion of any one of an infrared communication protocol, a wired/wireless IP protocol, and a Host Signal Processing (HSP) protocol.

The temporary synchronization storage unit 300 temporarily stores phone number information of the heterogeneous terminal 20 connected and synchronized. The temporary synchronization storage unit 300 can store respective phone number information of one or more heterogeneous terminals 20, independently. Thus, the number of connections of the heterogeneous terminal 20 can be determined depending on a storage capacity of the temporary synchronization storage unit 300 of the IP terminal 10.

Upon connecting to the heterogeneous terminal 20 through the terminal connection interface 100, the synchronization controller 200 sets synchronization with the heterogeneous terminal 20 and concurrently, stores phone number information of the connected heterogeneous terminal 20 in the temporary synchronization storage unit 300. The synchronization controller 200 generally uses the SyncML standard. The SyncML standard work is led by Ericsson, IBM, Lotus, Motorola, Nokia, Palm Inc., Psion, and Starfish Software. Throughout the world, about 660 companies have declared to support SyncML. Even in Korea, about 20 companies are in progress of the development of SyncML products and technologies. The SyncML standard uses XML. If pieces of phone number information of the heterogeneous terminal 20 are temporarily stored in the temporary synchronization storage unit 300, the synchronization controller 200 detects corresponding phone number information and performs synchronization.

The data converter 400 performs data conversion between phone number information of the heterogeneous terminal 20 stored in the temporary synchronization storage unit 300 and phone number information of the IP terminal 10 stored in the data storage unit 500.

The data converter 400 converts only a database format of phone number information selected through the user interface 600 and updates the temporary synchronization storage unit 300 by the converted phone number information.

The data converter 400 identifies a database format of the heterogeneous terminal 20 stored in the database format storage unit 700 using information of the heterogeneous terminal 20 that is, upon synchronization, detected by the synchronization controller 200, then compares the identified database format with its own database format, and then performs data conversion.

In the event that there is no phone number information for conversion, the data converter 400 converts data into a null value and applies the null value to a small size number of phone number information of the heterogeneous terminal 20 for conversion.

The user interface 600 displays phone number information stored in the temporary synchronization storage unit 300 or the data storage unit 500 for a user, while allowing the user to select the displayed phone number information of the heterogeneous terminal 20.

The database format storage unit 700 stores database format information of itself and at least one heterogeneous terminal 20.

The heterogeneous terminal 20 is any one of an IP terminal 10, a mobile communication terminal, a Personal Digital Assistant (PDA) terminal, and a Wireless Local Area Network (WLAN) terminal.

Figure 2:
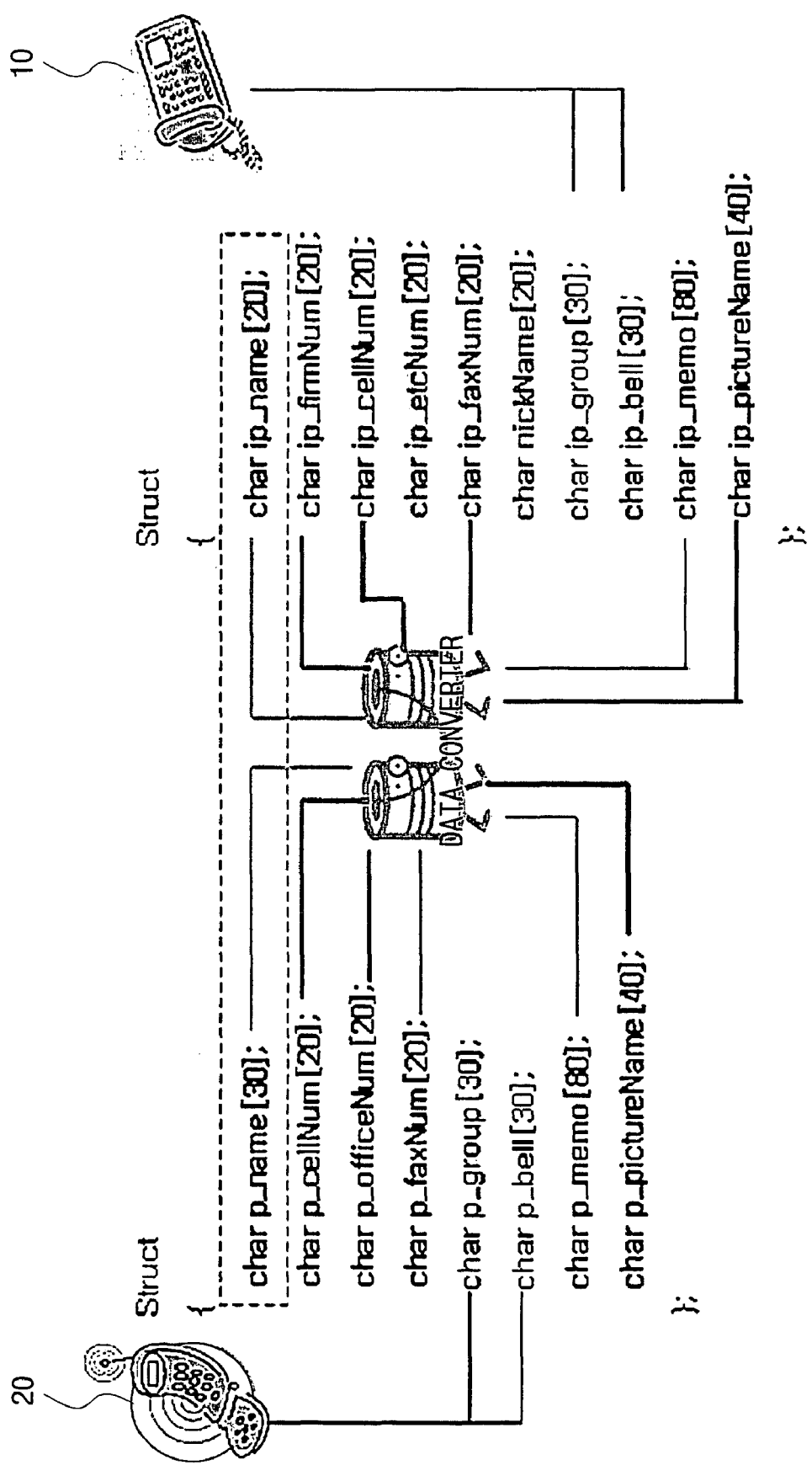
FIG. 2 is a diagram of a database format of a heterogeneous terminal in the apparatus of backing up the heterogeneous terminal user information in the IP terminal of FIG. 1.

A detailed description of general function and operation of each of the elements has been omitted and a description of the operation of the present invention follows with reference to FIGS. 1 and 2.

The terminal connection interface 100 connects to a heterogeneous terminal 20. The terminal connection interface 100 can apply the inclusion of any one of an infrared communication protocol, a wired/wireless IP protocol, and a Host Signal Processing (HSP) protocol.

The synchronization controller 200 sets synchronization with the heterogeneous terminal 20 in compliance with the SyncML standard and concurrently, stores phone number information of the connected heterogeneous terminal 20 in the temporary synchronization storage unit 300. The synchronization controller 200 can search the database format storage unit 700 storing database format information of itself and at least one heterogeneous terminal 20 and compare a database format of the mobile communication terminal with a database format of itself.

The temporary synchronization storage unit 300 temporarily stores respective phone number information of one or more heterogeneous terminals 20, independently.

After that, the data converter 400 performs data conversion between the phone number information of the heterogeneous terminal 20 stored in the temporary synchronization storage unit 300 and phone number information of the IP terminal 10 stored in the data storage unit 500.

FIG. 2 is a diagram of database formats of any heterogeneous terminal 20 and an IP terminal 10.

While the name information of the heterogeneous terminal 20 is "char p_name[30]", the name information of the IP terminal 10 is "char ip_name[20]" which is different in name and size.

Thus, the data converter 400 converts the name information of the heterogeneous terminal 20 to the same size as "char ip_name[20]" whose data size is small. That is, in the case of a conversion from the IP terminal 10 to the heterogeneous terminal 20, the conversion is performed as is and in the vice versa case, the name information of the heterogeneous terminal 20 is reduced to 20 bytes from 30 bytes for conversion. In the case of ip_ectNum or nickName with no item, the heterogeneous terminal 20 is not converted or applies a null value.

The data converter 400 identifies a database format of the heterogeneous terminal 20 stored in the database format storage unit 700 using information of the heterogeneous terminal 20 that is, upon synchronization, detected by the synchronization controller 200, then compares the identified database format with its own database format, and then performs data conversion.

The user interface 600 displays phone number information stored in the temporary synchronization storage unit 300 or the data storage unit 500 for a user.

Then, the user selects the phone number information of the heterogeneous terminal 20 displayed through the user interface 600.

Accordingly, if the user selects any phone number information among phone number information of the heterogeneous terminal 20 and phone number information of the IP terminal 10, the data converter 400 selectively converts only the selected information.

Figure 3:
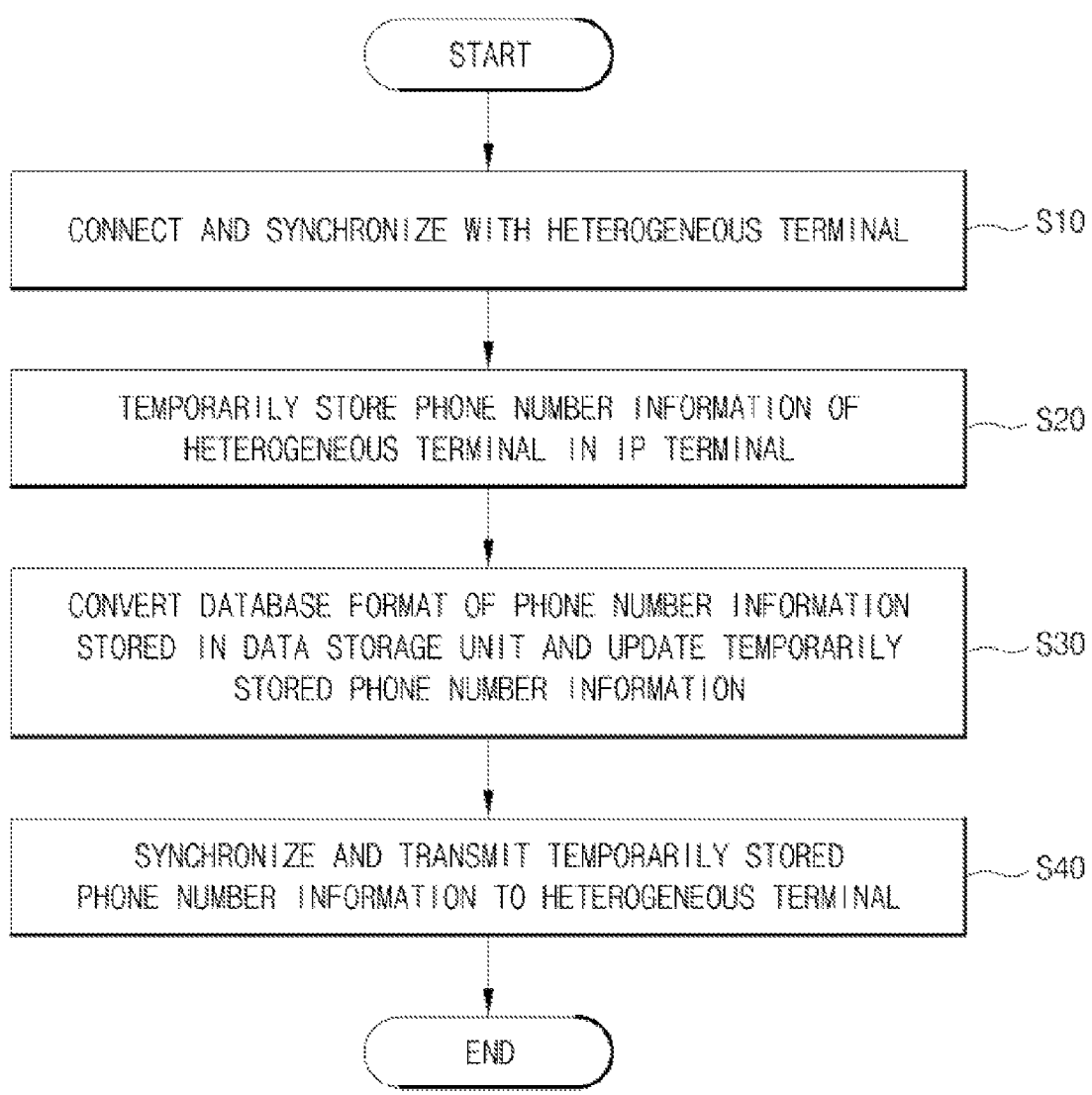
FIG. 3 is a flowchart of a method of backing up heterogeneous terminal user information in an IP terminal according to an embodiment of the present invention.

A method of backing up heterogeneous terminal user information in the IP terminal according to the present invention is described below with reference to FIG. 3.

The IP terminal 10 connects and synchronizes with a heterogeneous terminal 20 (S10). The connecting and synchronizing with the heterogeneous terminal 20 (S10) identifies a database format of the heterogeneous terminal 20 stored in the database format storage unit 700 using information of the heterogeneous terminal 20 detected from the database format storage unit 700 storing database format information of itself and at least one heterogeneous terminal 20.

Next, the IP terminal 10 temporarily stores phone number information of the synchronized heterogeneous terminal 20 (S20).

After that, the IP terminal 10 converts a database format of phone number information stored in the data storage unit 500 and then updates the temporarily stored phone number information by the converted database format (S30).

Figure 4:
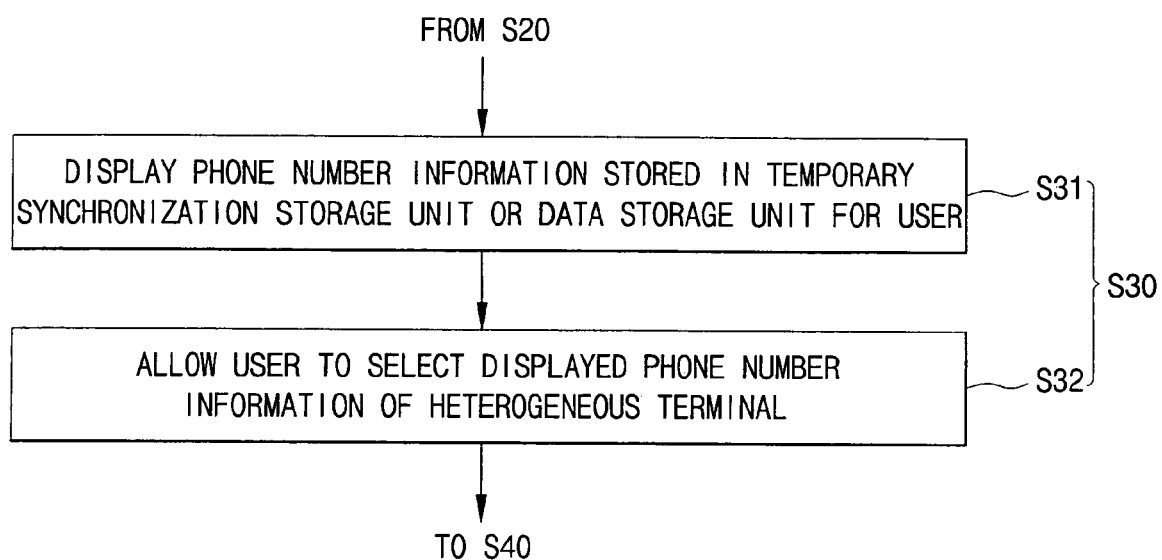
FIG. 4 is a flowchart of a detail of step 30 (S30) in the method of backing up heterogeneous terminal user information in the IP terminal of FIG. 3.

In the converting of the database format and then updating of the temporarily stored phone number information by the converted database format (S30), the IP terminal 10 displays phone number information stored in the temporary synchronization storage unit 300 or the data storage unit 500 for the user (S31) as shown in FIG. 4.

Next, the IP terminal 10 allows the user to select the displayed phone number information of the heterogeneous terminal 20 (S32).

In the event that there is no phone number information for conversion, the converting of the database format and then updating of the temporarily stored phone number information by the converted database format (S30) converts data into a null value and applies the null value to a small size number of phone number information of the heterogeneous terminal 20 for conversion.

Next, the IP terminal 10 synchronizes the temporarily stored phone number information and transmits the synchronized phone number information to a heterogeneous terminal 20 (S40).

The IP terminal 10 converts a database format of the temporarily stored phone number information of the heterogeneous terminal 20 and stores the converted database format in the data storage unit 500.

The heterogeneous terminal 20 is any one of an IP terminal 10, a mobile communication terminal, a PDA terminal, and a WLAN terminal. A method of connection with the heterogeneous terminal 20 includes any one of an infrared communication protocol, a wired/wireless IP protocol, and a Host Signal Processing (HSP) protocol.

As described above, the apparatus and method of backing up heterogeneous terminal user information in the IP terminal according to the present invention has an excellent effect of being able to perform a synchronization operation or an image move operation that has been implemented through the medium of a PC, without the PC by directly connecting terminals with each other.

Also, the apparatus and method has another excellent effect of being able to synchronize and back up, by one IP terminal, data of one or more heterogeneous terminals.

While the present invention has been shown and described in connection with the exemplary embodiments, it will be apparent to those skilled in the art that modifications and variations can be made without departing from the spirit and scope of the present invention as defined by the appended claims.

What is claimed is:

1. An apparatus to back up heterogeneous terminal user information in an Internet Protocol (IP) terminal, the apparatus comprising:
 a terminal connection interface to connect to a heterogeneous terminal;
 a temporary synchronization storage unit to temporarily store phone number information of the heterogeneous terminal;
 a synchronization controller to set synchronization with the heterogeneous terminal and to concurrently store the phone number information of the connected heterogeneous terminal in the temporary synchronization storage unit, in response to the heterogeneous terminal connecting to the terminal connection interface; and
 a data converter to perform data conversion between the phone number information of the heterogeneous terminal stored in the temporary synchronization storage unit and phone number information of the IP terminal, the phone number information of the IP terminal being stored in a data storage unit,
 wherein, in the absence of phone number information for conversion, the data converter converts data into a null value, and
 wherein the data converter applies the null value to a smaller sized number corresponding to the phone number information of the heterogeneous terminal for conversion.

2. The apparatus according to claim 1, further comprising:
 a user interface to display the phone number information stored in the temporary synchronization storage unit or the data storage unit for a user and to allow the user to select the displayed phone number information of the heterogeneous terminal.

3. The apparatus according to claim 2, wherein the data converter converts a database format of phone number information selected through the user interface and updates the temporary synchronization storage unit by the converted phone number information.

4. The apparatus according to claim 1, further comprising: a database format storage unit to store database format information of the IP terminal and at least one heterogeneous terminal.

5. The apparatus according to claim 4, wherein the data converter identifies a database format of the heterogeneous terminal stored in the database format storage unit using information of the heterogeneous terminal that is, upon synchronization, detected by the synchronization controller, and then compares the identified database format with the database format of the IP terminal, and then performs data conversion.

6. The apparatus according to claim 1, wherein the heterogeneous terminal comprises one of an IP terminal, a mobile communication terminal, a Personal Digital Assistant (PDA) terminal, and a Wireless Local Area Network (WLAN) terminal.

7. The apparatus according to claim 1, wherein the terminal connection interface comprises one of an infrared communication protocol, a wired/wireless IP protocol, and a Host Signal Processing (HSP) protocol.

8. The apparatus according to claim 1, wherein the synchronization controller temporarily stores each of phone number information of one or more heterogeneous terminals in the temporary synchronization storage unit, in response to the terminal connecting interface connecting with the one or more heterogeneous terminals concurrently or respectively.

9. A method to back up heterogeneous terminal user information in a selective synchronization method of an Internet Protocol (IP) terminal, the method comprising:
 connecting and synchronizing with a heterogeneous terminal;
 temporarily storing phone number information of the synchronized heterogeneous terminal;
 converting a database format of phone number information stored in a data storage unit and updating the temporarily stored phone number information by the converted database format; and
 synchronizing and transmitting the temporarily stored phone number information to the heterogeneous terminal,
 wherein the converting and updating comprises converting data into a null value in the absence of phone number information for conversion and applying the null value to a smaller sized number corresponding to phone number information of the heterogeneous terminal for conversion.

10. The method according to claim 9, further comprising converting a database format of the temporarily stored phone number information of the heterogeneous terminal and storing the converted database format in the data storage unit.

11. The method according to claim 9, wherein the converting of the database format and updating of the temporarily stored phone number information comprises:
 displaying phone number information stored in the temporary synchronization storage unit or the data storage unit for a user; and
 prompting the user to select the displayed phone number information of the heterogeneous terminal.

12. The method according to claim 9, wherein connecting and synchronizing with the heterogeneous terminal comprises:
 identifying database format of the heterogeneous terminal stored in a database format storage unit, using information of the heterogeneous terminal that is detected through the database format storage unit storing database format information of an IP terminal and at least one heterogeneous terminal.

13. The method according to claim 9, wherein the heterogeneous terminal comprises one of an IP terminal, a mobile communication terminal, a Personal Digital Assistant (PDA) terminal, and a Wireless Local Area Network (WLAN) terminal.

14. The method according to claim 10, wherein a method of connection to the heterogeneous terminal comprises one of an infrared communication protocol, a wired/wireless IP protocol, and a Host Signal Processing (HSP) protocol.

* * * * *